United States Patent [19]

Randall et al.

[11] Patent Number: 5,606,705
[45] Date of Patent: Feb. 25, 1997

[54] COMMUNICATION COORDINATOR FOR MESSAGES TO BE SENT FROM AT LEAST ONE DATA SOURCE TO A PLURALITY OF CLIENTS

[75] Inventors: Jeffrey C. Randall, Minneapolis; Anil K. Gowda, Eden Prairie; Timothy F. McCarthy, Plymouth; Edward L. Schwarz, Minneapolis, all of

[73] Assignee: Honeywell Inc., Minneapolis, Minn.

[21] Appl. No.: 228,057

[22] Filed: Apr. 15, 1994

[51] Int. Cl.$^6$ ............................................. G06F 15/00
[52] U.S. Cl. ................... 395/800; 395/200.01; 340/506
[58] Field of Search ............................. 395/800, 200, 395/200.01; 340/506; 379/88

[56] References Cited

U.S. PATENT DOCUMENTS

| | | | |
|---|---|---|---|
| 4,554,418 | 11/1985 | Toy | 379/88 |
| 4,804,937 | 2/1989 | Barbiaux et al. | 340/52 |
| 5,039,980 | 8/1991 | Aggers et al. | 340/506 |
| 5,049,873 | 9/1991 | Robins et al. | 340/825.06 |
| 5,155,842 | 10/1992 | Rubin | 395/182.2 |
| 5,369,570 | 11/1994 | Parad | 364/401 |
| 5,386,503 | 1/1995 | Staggs et al. | 395/157 |
| 5,388,255 | 2/1995 | Pytlik et al. | 395/600 |
| 5,390,138 | 2/1995 | Milne et al. | 381/119 |

OTHER PUBLICATIONS

EP, A, 0 365,337 (Hewlett–Packard Co.) 25 Apr. 1990.
WO, A, 91/03017 (Microsoft Corp.) 7 Mar. 1991.

*Primary Examiner*—Eric Coleman
*Assistant Examiner*—John Follansbee
*Attorney, Agent, or Firm*—Edward L. Schwarz

[57] ABSTRACT

A computer has access to a number of data items available from at least one data source. The computer receives requests for the values of certain of these data items from a number of different clients which may be either devices external to the computer or application programs operating in a multitasking environment within the computer. As each request is received from a client, it is stored in a data item table. The computer replies to each client request in the data item table with a data item value available somewhere in the data item table. The computer updates older data item values held by the data item table by requesting those data item values from the data sources which provide them. The data item values supplied to clients are those from previously received data source replies if these replies are not too old. This reduces the number of requests for data item values which the data sources must handle, reduces traffic on a data link which might otherwise be overloaded, and reduces the delay in responding to client requests.

14 Claims, 8 Drawing Sheets

COMMUNICATION COORDINATOR FOR MESSAGES TO BE SENT FROM AT LEAST ONE DATA SOURCE TO A PLURALITY OF CLIENTS

BACKGROUND OF THE INVENTION

With the decreasing cost and increasing power of microcontrollers, it has become common to use them as individual processing modules for all sorts of complex information gathering, processing, and displaying functions, as well as for controlling the operation of systems of all types. Microcontrollers are typically used in two different ways. In the first of these, they are embedded in a system along with ROM (read only memory) in which dedicated software instructions are permanently held, and with a modest amount of RAM (random access memory) for holding operand values for short periods of time. An embedded microcontroller and its software usually comprise only a single processing module. These microcontrollers are also used as the processing element in the extremely common personal computers having large disk memories, a large RAM, and a keyboard and display unit for communication with a human. A personal computer can hold a number of separate software applications and operate these more or less simultaneously in a multitasking mode. By "multitasking" is meant that instruction execution proceeds for one software application for a period of time, and then is transferred to another application. An external event or simply the passage of a prescribed period of time may transfer execution of instructions from one to another application. The appearance is thus created that a number of multitasked applications are operating simultaneously, even though two instructions from two different applications are typically not executed precisely simultaneously. Each of the multitasked applications can be considered a separate processing module, in that each has an independent existence. As a practical matter, it is frequently possible to perform a particular function with a processing module of either of these types.

It is common to employ a number of these processing modules in a single system, each of them dedicated to a specific function or group of functions. These processing modules may each comprise a separate microcontroller. It is also possible to have a number of different software applications of a single system operating in this multitasking mode within a single microcontroller, each software application also comprising a processing module. It is also possible to have a hybrid system, comprising a personal computer with a number of software types of processing modules along with a number of embedded microcontrollers also performing functions in the system. There are a number of advantages in dividing the computing burden in this way. Some functions are more effectively performed with one type of processing module, some with others. It is possible that there are uses for certain types of processing modules in different types of systems, and by modularizing the function, can be more easily transferred between the systems. Also, modular systems can be more easily analyzed when the inevitable errors arise, in that there are well-defined inputs and outputs lending themselves to easier access.

In order to coordinate the activities of these processing modules, it is useful to connect the individual processing modules of a larger system which perform these functions in a way which allows transfer of data among the processing modules. Where these processing modules are separate microcontrollers, they may be interconnected by cabling over which data is transferred. Many different types of arrangements permitting efficient and reliable transfer of data between a number of embedded or stand-alone processing modules have been designed. This problem is not trivial. Where the processing modules are multitasked software applications, it is of course possible to establish protocols allowing these processing modules to communicate with each other. Since only one at a time is typically active, the problem is somewhat simpler.

The data involved will typically indicate some quantity or value to which the processing module has access say through external sensors or which the module generates during its processing operations. This data will typically comprise discrete elements, and each of these elements of data will be referred to as a data item. For example in an environment control system, ambient air temperature may be a data item. Status, open or closed, of a valve controlling flow of fuel or refrigerant may be another data item. The result of a calculation may be another example of a data item. A data item may be generally considered to be a particular data element which has some digital value. A data item will typically also have an identity code which uniquely identifies it, since a source for a data item value may well be able to provide a number of different data items values.

As a system becomes more complex, the number of data items available will usually become large. In most cases, one processing module will have need for only some of the data item values which another of the processing modules has available. For example, a furnace controller may not need to have access to the temperature of the controlled space. All that it may need from the temperature control processing module is a demand flag which is set whenever the furnace must operate. One way to address the problem arising from transferring data unnecessarily between processing modules is to establish the protocol that one processing module will transmit a data item value to another only when requested. To follow the example from above, the furnace controller may request the demand flag data item every second or so from the temperature controller, and then based on its value will start up, shut down, or continue the current status of the furnace. In such a system, the processing module initiating a request signal is known as the client, and the processing module to which the request signal is sent is known as the data source, or simply "source". In an appropriate system, a particular processing module may be a client with respect to one request signal and a source with respect to another.

As the communication and control required by physical systems have become greater, the connections between the processing modules involved with these systems have become increasingly complex. If there are a large number of either clients or sources, it is not practical to have individual data paths from each of the modules to every other module. The situation may be complicated even more by the fact that the replies from data sources to requests may proceed very slowly compared to the internal speed of the clients because of high traffic levels on the data paths involved or because of slow processing speed for one or another reason on the part of the data source. The fact that individual processing modules may be physically spaced a substantial distance from each other and connected by a telephone modem is one obvious cause for slower speed. For all of these reasons, it has been found that it is sometimes more efficient to route all of the requests for data items and the replies to them through a single processing module. This routing function is one made to order for the high data handling capabilities of the small and cheap but powerful desktop computers now available. Where at least one of the processing modules in the system is already implemented within a desktop computer, it is convenient and cheap to devise a processing module which operates within that desktop computer, for directing and routing processing module communications.

The computer in which operates the processing module redirecting the client requests to the various sources and receiving and replying with the data item values, will be called the server computer, whether serving as the host for clients or data source applications or not. That is, in the case where client or source processing modules are multitasked software applications, the host computer in which the client or source applications execute may also be the server.

These host computers use an operating system of some type to accomplish the various communication and control functions which are a necessary adjunct to the application programs. For the IBM compatible types of computers, the most widely used of these operating systems is DOS. It is now usual for the more powerful types of these computers to use a higher level graphics-based operating system to accomplish many of these communication and control functions. For IBM compatible computers, this graphics-based operating system is known as "Windows". The function set available from the Windows operating system is much larger than that of DOS, but Windows uses many of the functions in DOS in implementing its own functions. Both DOS and Windows include a number of utility routines which are available to all of the application programs to perform common software communication and other functions, thereby freeing each of the users from having to individually replicate these frequently used functions. Certain of these utility routines will be mentioned in the description which follows.

The Windows operating system, recognizing the need for communication among the applications resident in the host computer, includes a function known as Dynamic Data Exchange (DDE) which allows one application program to request data items from another. In this function, an application provides a request to the Windows system identifying another application and the data item desired from it. The Windows system DDE function then requests that data item from the designated application, and responds to the requesting client application with that data item. A protocol is provided for this function which specifies such matters as formats of requests and replies, timing requirements, and error management. DDE data requests are of two types. One type is called a cold link, where a client request requires only a single response. The other type is a hot link, where a single request causes an immediate response, and then further responses at intervals specified by the hot link request, until the requesting client closes down the hot link request. Since each hot link periodically requires additional processing time, it is in no application's interest for a hot link to exist if unneeded. Therefore, as the need for a particular data item disappears, the requesting application should close down the hot link request, and this is customary.

The DDE function is intended for use where the data links between both the clients and the sources are host computer software processing modules, and therefore relatively fast. We have found that the DDE mechanism can also work reasonably well in a situation where the requested information is provided by the external sources mentioned above, rather than by application programs within the host computer. In one situation, the routing computer may be considered to include a single multiplexer or gateway to which is connected a number of data sources, each of which can have a relatively large number of data items available. A request (hereafter "source request") supplied to the gateway specifies the data source connected to the gateway and the specific data item value desired from that gateway. The gateway will send its own request to the specified data source and receive in reply the data item value from the data source in a data source reply. Because of the relative slowness of replies from the individual data sources and the extra gateway stage for both request and reply however, there is a substantial delay of at least several tenths of a second, and perhaps even several seconds, for the server to receive the data source reply sent in response to each request.

If client requests are relatively infrequent and the data link to the source is fast, the server can provide the requested information to clients relatively promptly. When a client request arrives, the routing computer simply sends the appropriate data source request via the gateway to the source from which the data item value is available. When the data source reply is returned to the routing computer, it passes the data item value therein on to the requesting client per the usual DDE procedure. Each data source reply includes a number of other parameters. These identify the data item value, the client which originated the client request to which the reply is directed, etc.

The server must be able to deal with the situation where a number of client data requests are pending at a particular time. This happens frequently where the gateway is of the type which accepts only a single source request at a time, but it can also happen where the volume of client requests exceeds the processing speed of the gateway. In such a situation, replies to client requests are delayed, perhaps to an extent where the data item value is worthless to the client when it is finally received. In the situation where the long term rate of client requests is greater than the capacity of the gateway or data sources to respond, then client requests will simply be lost since the table in which they are stored can have only finite capacity, and the entries will continue to grow. Thus, it would extremely valuable to be able to limit the number of source requests without limiting the number of replies sent to the clients.

BRIEF DESCRIPTION OF THE INVENTION

It may not be possible to speed up the data paths or the gateway linking the server computer and its clients to the data sources, and yet it is possible in many cases to provide data item values in a more timely manner to many of the clients by using the apparatus of this invention. We have found that in many of these types of systems, duplicate requests from different clients for the same data item occur relatively close in time to each other. We have further found that it is sometimes acceptable to answer all of these duplicate requests with the value provided in response to a single reply from a source for a data item value. The apparatus and method of our invention recognize this situation and allows a single data request from the routing computer to the data source for the data item involved to provide the data item encoded in the response to each of a number of the client requests for that data item.

Our invention is an improvement in a communication system for supplying values for data items each having its own identity code and each available from a single one of at least one data source, to each one of a plurality of clients each having its own identity code. Each of these clients requests the data item values by transmitting client request signals encoding the identity codes of the data items and the client identity code to the server or data item router on a client data link. The client data link allows for two way communication directed between each client and the server or router. A source data link allows two way communication between each data source and the server. Each data source provides to the server on the source data link a source reply signal encoding a data item value and the data item identity code for that data item responsive to a source request signal provided on the source data link by the server to the data source from which that data item's value is available. The source request signal sent by the server encodes the identity code of the data item desired.

The server includes a processing unit and a data memory. The processing unit can store data in and retrieve data from the data memory. In particular, the processing unit can transmit to, and the data memory can record, a data item table and a request table each comprising a plurality of entries. Each of these tables is built up an entry at a time by the processing unit. Each data item table entry is associated with a data item identity code and records a data item value, and each request table entry records a client identity code in association with a data item identity code. The processing unit can also retrieve the contents of the individual entries from each of these tables by appropriate searches or other access based on a key such as the identity code of a particular data item.

The activity of the processing unit is controlled by software instructions which may be stored in a part of the data memory or in a separate instruction memory which may be a so-called read only memory (ROM). The individual means to be described in the following materials will preferably be a part of the processing unit and thus implemented in software, since software means create the necessary functions more efficiently. However, the means may also be implemented in hardware only or be a combination of both hardware and software. Where the invention is implemented as software controlling the processing unit operation, the client data links and the source data links may comprise a part of the internal data transfer paths of the processing unit and also a part of its internal memory elements.

The invention includes a request table means connected to the client data link and receiving each client request signal. The request table means records in an entry in the request table for each client request signal, the identity code for the client supplying that client request signal in association with the identity code of the data item in that client request signal. The invention also includes source request means for scanning the request table and for issuing source request signals encoding the data item identity codes recorded in the request table.

Further, there is a data item value means connected to the source data link and receiving the source reply signals. The data item value means records in an entry in the data item table in association with the data item identity code encoded in each source reply signal, the data item value encoded in that source reply signal. There is also a data item reply means connected to each client data link for scanning the request table, and for issuing a plurality of client reply signals on the client data link. Each of these client reply signals encodes a data item value recorded in the data item table and is directed to a client whose identity code is in the request table.

In a preferred embodiment, this communication system further includes a clock providing a clock signal encoding a time value comprising the time of day and the identity of the day. The typical personal computer includes an internal clock which serves this function. In this embodiment, the data item value means further comprises time stamp means receiving the clock signal for recording in the data item table in association with the data item whose identity code is encoded in a source reply signal, the time value encoded in the clock signal at the time the source reply signal was received. The data item reply means includes age value means for calculating an age value equal to the difference of the time value encoded in the clock signal and the time value recorded in the data item table in association with a data item whose identity code is recorded in the request table. The age value means also issues a client reply signal encoding the data item value recorded in the data item table in association with that data item responsive to the time value encoded in a valid item signal exceeding the age value calculated for that data item. The data item reply means also includes valid item means for issuing a valid item signal encoding a valid item time value.

DESCRIPTION OF THE PREFERRED EMBODIMENTS

Figure 1:
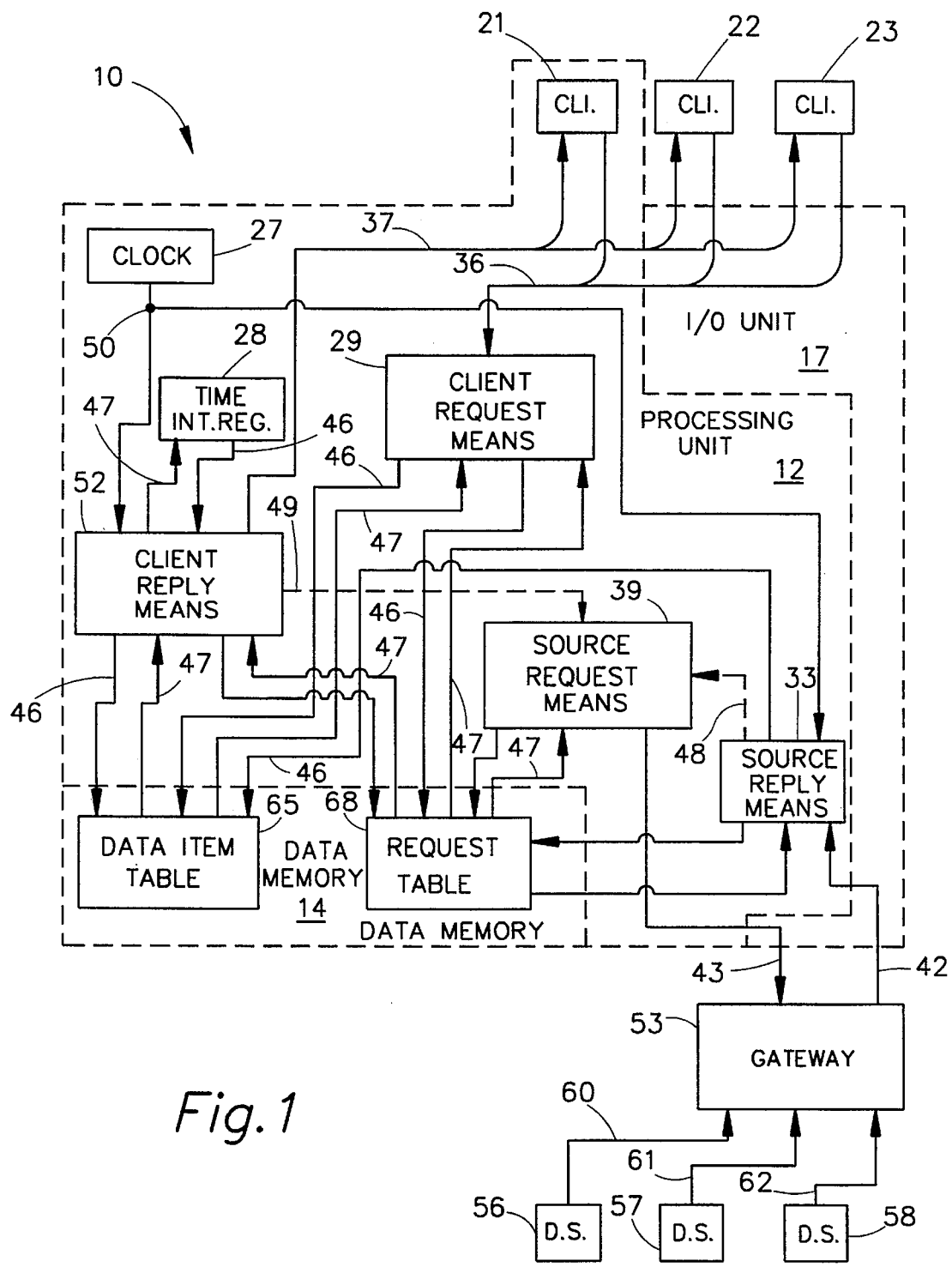
FIG. 1 is a block diagram illustrating the major elements of the invention as embodied by a typical small computer.

FIG. 1 illustrates the broad outline of the invention as it might be embodied in a small computer 10 such as those based on the microcontrollers commonly used in the personal desktop and laptop computers now widely available. The invention is implemented by means of software instructions which form a part of the preferred embodiment of the invention. The various means shown in this block diagram are momentarily created by execution of these instructions. That is, the computer 10 momentarily becomes each of these means as the appropriate instructions are executed. While computer 10 executes instructions which configure computer 10 as one of these means, computer 10 actually becomes these means, and then becomes some other type of element, perhaps not even part of this invention.

Computer 10 is shown as conventionally comprising three main parts, a processing unit 12, a data memory 14, and an input/output (I/O) unit 17. Three clients 21–23 are shown as connected for two way communication with processing unit 12 on a client data link having an output (with respect to processing unit 12) path 37 and an input path 36. Each client 21-23 may have its own data link or the clients may share a single data link in some way. The two sections of the input and output paths 36 and 37 shown passing through the I/O unit 17 are connected to external (to the computer 10) clients 22 and 23. Showing the input and output paths 36 and 37 as passing through the I/O unit 17 symbolizes that clients 22 and 23 are external to computer 10. Client 21 is internal to computer 10, so the input and output paths 36 and 37 are shown as directly connected with client 21. As an internal client, client 21 is a software program which operates in a multitasking mode, sharing time with other clients not illustrated in FIG. 1 as well as with the individual means shown within processing unit 12 as forming the invention itself. Clients 21–23 provide on the input paths 36 of their data links, messages encoded in client request signals which specify the sources which are to provide data identified in the client request messages as well as specifying other information related to the way in which each client request message should be processed. Each client request message includes a number of parameters which specify the data item whose value is desired and the conditions under which this value is provided. Clients 21–23 receive client reply signals encoding the values of the data items specified in the client request signals.

A gateway element 53 serves as an interface unit between computer 10 and a number of data sources 56–58 which transmit the data values to gateway element 53 on paths 60–62 respectively. In a sense, gateway element 53 itself forms a data source which performs a multiplexer function in supplying requested data values to processing unit 12. Gateway element 53 is connected to the processing unit through a source data link having an output path 43 and an input path 42. Gateway element 53 will typically have its own microcontroller which will interpret source request messages provided on path 43. These paths 42 and 43 are shown as passing through I/O unit 17 and connected to various of the means within processing unit 12. This is meant to symbolize that gateway 53 is connected to a standard port of the computer 12. Each data source 56–58 has a unique address which identifies it.

Each data source 56–58 may itself also include a microcontroller for controlling operation of a physical process of some kind, or may on the other hand be nothing more than a sensor or group of sensors connected to a gateway element 53 which provides as data item values, the sensed numeric values of varying physical parameters such as temperature, pressure, etc. The term "data item" will be used hereafter to generally refer to the identity of a particular parameter having a varying value to be supplied from the data sources 56–58 to the clients 21–23. A data item need not be a physical parameter, but may also be a digital code value indicating the status for some condition in a physical process, such as presence of flame in a burner, on or off status of a switch, etc. A data item may also be a computed numeric value such as operating efficiency, mean or standard deviation of a sample, etc.

Gateway element 53 supplies a data item value in a source reply message in response to a message encoded in a source request signal carried on path 43 and supplied by a source request means 39 forming a part of processing unit 12. Each source request message includes a data item identity code which includes the address of the data source 56–58 and the address within the data source 56–58 if appropriate, from which the value of the particular data item is available. The data item identity codes supplied to gateway 53 in source request messages were previously a part of client request messages received from the clients 21–23, and it is from these client request messages that the data item identity codes contained in the source request messages originate.

As explained above, it is likely that the time required for gateway element 53 and a data source 56–58 to supply a requested data item value may be several tenths of a second or even longer, which is quite a long time relative to the processing speed of modern desktop computers. If there are large numbers of data item values which must be supplied through the gateway 53, these response times can cumulatively impact the performance of the system. This invention addresses these time delays by reducing the number of requests which gateway 53 must handle.

Processing unit 12 executes groups of software instructions, and by so doing the various means shown in FIG. 1 are caused to exist for periods of time. Since the instruction processing resources of the computer 10 are directed from one task to another as part of the multitasking operation, these means will typically exist only for brief periods of time. Each means comes into existence when an interrupt occurs which transfers instruction execution to the instructions which transform processing unit 12 into that means. The term "interrupt" refers to the transfer of instruction execution to an out of sequence address in response to a condition not directly arising from the execution of an instruction. These means are shown communicating with a data item table 65 and a request table 68, each of which form a part of the data memory 14. Data is transferred to and from the data item table 65 and the request table 68 on data paths 46 and 47 respectively and which form a part of the internal data paths within computer 10 between its memory 14 and its processing unit 12. These paths 46 and 47 are shown indicating the presence and direction of data flow between each of these means when it is in existence, and the data item table 65 and request table 68. Although a number of data paths 46 and data paths 47 are shown, there will typically be only a single one of each which allows processing unit 12 to communicate with data memory 14. As the individual means come into existence, the data paths shown connected to those means will carry data as shown to the data item table 65 and the request table 68.

The data item table 65 and the request table 68 each comprise a number of individual entries. Each of these entries when active record the parameters relating to a single client request signal. Each entry is accessible by use of an index value which specifies the position of the entry in the table. This is well known by those with even moderate skill in software development, but should be mentioned because the following discussion of the flowcharts which allow implement of the invention by those with ordinary skill in these arts, makes extensive use of this indexing procedure. The index to a table comprises an identifier which designates a single entry to that table. In the data item table 65, the combination of a data item identity code and a client identity code also uniquely identifies a single entry. By searching the entire data item table 65, it is possible to use the combination of the data item identity code and the client identity code as an identifier which designates a single data item table 65 entry. Because of the large amounts of searching required to use such an identifier, we prefer the simpler and faster indexing approach. In the request table, the data item identity code itself uniquely identifies an entry and may be used as the identifier. Since the request table 68 is much shorter table, it is possible to use the data item identity code as its entry identifier although here too, use of an index is faster and more straightforward.

A portion of data memory 14 also typically comprises an instruction memory which stores the software instructions whose execution cause processing unit 12 to comprise the various means shown in FIG. 1 as well as software for performing other tasks. In an actual embodiment, the data memory 14 will typically comprise both a disk drive and RAM (random access, i.e. semiconductor, memory). During execution of the instructions which comprise this invention, the request table 68 and the data item table 65 will typically be held in RAM, and then when a different application is to be executed, will be re-recorded in the disk drive portion of data memory 14. The disk drive portion of the memory is non-volatile, meaning that loss of electrical power will not cause loss of the data recorded therein.

Each active entry of the data item table 65 stores a number of parameters relating to a single client request signal. A partial list of these parameters includes: the identity code of the client which generated the item; the data item identity code associated with the entry; the most recent value of the data item and the time received; the update time, i.e., the time at which the client should receive a client reply signal for the entry's data item; and the update interval, i.e., the time interval between these client reply signals. Except for the data item values, the times at which the data item values are received, and the update times, all of these data item table 65 parameters are supplied by the client request signals. As noted above, the combination of data item identity code and client identity code in a data item table 65 entry is unique.

The interrupts which were mentioned above as initiating the existence of the various means shown as forming a part of processing unit 12, on occasion arise from passing of time. Clock 27, a hardware element of processing unit 12, plays an important part in this activity. Clock 27 provides on a path 50 a clock signal which encodes the date and the time of day. When a previously stored value in a time interrupt register 28 matches the time value provided by clock 27 on path 50, instruction execution is transferred to instructions in a first address and addresses following of the instruction memory which contain instructions associated with the value in register 28. Executing these instructions causes processing unit 12 to comprise a client reply means 52. Interrupts arising from a match of the clock signal on path 50 and the contents of the time interrupt register 28 are called time interrupts. The values stored in the time interrupt register 28 are set so that processing unit 12 executes the client reply means 52 instructions at regular intervals, and in fact in the preferred embodiment, the value in time interrupt register 28 is updated by instructions implementing client reply means 52 itself.

The contents of time interrupt register 28 are arranged to periodically cause the instructions of client reply means 52 to be executed. These instructions cause processing unit 12 to scan the data item table 65 and detect each entry in which is an update time indicating that a reply to the client is due, that is, the entries whose update time is less than the current time. If a sufficiently new (i.e., young) value for the data item is available within the data item table 65, the client reply means 52 instructions immediately use this value to reply to the request. If not, the client reply means 52 issues a signal on path 46 which inserts in an entry of request table 68, the index of the data item table 65 entry whose update time is now due. However, before entering this data item in request table 68, client reply means 52 searches request table 68 for this index and if found, does not enter this index in request table 68, thereby preventing any data item from appearing in the request table 68 more than once. After the scanning of data item table 65 is complete, the client reply means 52 transfers execution of instructions to the addresses containing the instructions which implement source request means 39. This branching to the source request means 39 instructions is symbolized by dotted line 49.

External events can also generate signals which create an interrupt. Typically, these external or event interrupts are accompanied by a message which comprises parameters defining operations which the processing unit 12 is requested to perform by the interrupt. In our embodiment of the invention, an event interrupt forms a part of both a client request signal from one of the clients 21–23 and a source reply signal from gateway element 53. (While the interrupt generated by internal client 21 is not technically an external interrupt, it can be handled in the same manner, and hence the interrupts from these clients will not be distinguished.) The event interrupt with each client request signal causes processing unit 12 to temporarily comprise a client request means 29. The interrupt forming a part of each source reply signal causes processing unit 12 to temporarily comprise source reply means 33. As the client request means 29, processing unit 12 stores the parameters in the message encoded in each client request signal in an entry of the data item table 65 associated with that client request signal. By so doing, this data item table 65 entry becomes active. These parameters allow data item values to be properly requested from the data sources 56–58 and replies encoding these data item values to be properly sent to clients 21–23. There are two types of client request messages. A cold link message has its cold link flag set, and requires only a single client reply message for the specified data item value. The data item table 65 entry for a cold link request is deleted as soon as the client reply message for that client request message has been sent. If the cold link flag is not set, the message is a hot link message, meaning that client reply messages are sent at intervals specified in the client request message or when the data item value changes. A further function of the client request means 29 provides for deleting hot link entries from data item table 65. Presence of a delete flag in a client-request message specifies that the data item table 65 entry for the client request message's client and data item is to be deleted.

As the source reply means 33, processing unit 12 receives the source reply signal on path 42 from gateway 53. The source reply signal is provided in response to a previous source request signal. The message encoded in each source reply signal includes a previously requested data item value which the source reply means 33 stores in the data item table 65 entry whose index is also encoded in the source reply message. The time of day when the source reply signal is received is also stored in the data item table 65 entry specified by that data item table index, and the clock signal on path 50 is provided to the source reply means 33 for this reason. After the instructions which cause processing unit 12 to comprise source reply means 33 have been executed, instruction execution is transferred to the instructions which implement the source request means 39, as symbolized by the dotted lines 48 which connect means 33 to source request means 39.

In the embodiment for which this invention has been currently designed, gateway element 53 can process only one source request message at a time. Thus, the source reply message for each source request message must be received before the next can be sent. The instructions for source request means 39 cause processing unit 12 to search the request table 68 for any entries holding a data item index for which a source request message is not pending. Source request means 39 selects the one of these entries in table 68 having the oldest (smallest) update time in its corresponding data item table 65 entry, and issues a source request message to gateway element 53 on path 43 which includes the data item identity code in the data item table 65 entry associated with that request table 68 entry. Each request table 68 entry is deleted after gateway element 53 has supplied the corresponding source reply message to the source reply means 33.

It is also possible to adapt this invention to operate with a gateway element 53 capable of processing a number of source request messages simultaneously. In such apparatus, it is necessary to maintain a counter whose contents currently indicate the number of pending source requests, so as to not exceed the capacity of gateway 53. This invention may also be implemented with a number of gateway elements, each connected to its own data link.

One can see that the likelihood that a particular data item value is accurate will tend to decrease with the passage of time. It is therefore necessary to provide for each data item a valid data interval value which defines the time interval following the instant when a data item value is received during which the data item value will be deemed acceptably fresh. In the preferred embodiment, the update interval in data item table 65 entries also serves as the valid data interval during which each data item value is presumed to be correct for the purposes of the client 21–23 involved. It is, however, also possible to use for this valid data interval a single value assigned to all of the data item table 65 entries and which will then presumably be different from at least some of the update intervals. The software may also be designed to allow the client to separately specify in the client request message the valid data interval for a data item value. However the valid data interval is defined, the client reply means 52 examines each data item value which is available in the data item table 65, and if it was received before the start of the valid data interval in the data item table 65 entry for that data item, the client reply means 52 inserts a new entry in the request table 68 which will sooner or later result in a source request message to gateway element 53 for that data item. In this way, the data item values provided to each client 21–23 will be updated at a rate which assures a level of freshness which the client 21–23 involved has specified as adequate.

In general, this apparatus will at worst generate requests to gateway 53 for a particular data item value only slightly faster than for the client request signal for that data item value having the shortest update interval. In this way, traffic on the connection between the server and the various data sources is minimized, and at the same time relatively fresh data is supplied to the client. While the data item values supplied from the responses to other client request signals may not be as fresh as if they had resulted from source request messages initiated from the data item table 65 itself, they will usually be supplied more promptly than if a source request message were to be issued for each client reply message required. Our invention can frequently compensate for slow response times in gateway element 53 and its data sources 56–58. By setting the update intervals for client requests properly, it is possible to provide reasonable assurance that the data item values supplied to clients will be sufficiently fresh and frequent for the purposes of the client involved.

As mentioned already, the invention shown in FIG. 1 is preferably implemented as a properly programmed computer 10. It is therefore appropriate to present the detailed embodiment in terms of the software or object code which configures computer 10 as the various elements shown in FIG. 1. Since the structure and instruction format of these computers differs from type to type, it is most helpful to describe the software by means of the generic software structure. One universally accepted form for defining the structure of software is by flowcharts from which those having ordinary skill in the art can develop the source and object codes for a particular computer allowing the practice of the invention. The following description explains the operation of a computer 10 which executes software constructed according to the flowcharts of FIGS. 2–6.

Regardless, it is important to remember that the computer 10 itself physically comprises the invention once object code written according to the flowcharts whose description follows, has been loaded and then is executed by the computer. That is, object code following these flowcharts controls the operation of the computer 10 so as to transform it in a way causing it to actually comprise the invention shown in FIG. 1. Object code comprises the individual instructions which are executed or interpreted by the computer in order to process data which it receives from external sources. As such, this invention has physical existence in the form of such a properly programmed computer. As was mentioned earlier, this object code is stored in a portion of the data memory 14, and this portion of the data memory 14 therefore also forms a part of the various functional means shown in FIG. 1 and included in the claims. Some computers have a special instruction area of their memory 14 in which the instructions may be stored. Others use the area in memory 14 in which data is stored to also store the object code. At any rate, one may consider the various means shown in FIG. 1 as physically comprising the portion of data memory 14 in which the object code is stored as well as the circuitry of processing unit 12 which actually executes the instructions forming this object code.

In the flowcharts which follow, we have followed more or less standard flowcharting conventions. Each block with straight sides represents one or more instructions which specify predetermined actions by the computer. Lines connecting these blocks indicate by their arrows the sequence of instruction execution. Rectangular blocks such as at 132 (FIG. 3) are generally activity elements indicating instructions which cause the computer 10 to comprise means for manipulating or altering data held within the memory 14. Hexagonal blocks as at 129 (FIG. 3) are decision elements representing instructions which may alter the sequence which further instruction execution follows depending on the result of the indicated test on data held within the memory 14. Small circles as at 121 in FIG. 2 symbolize an position in an address sequence where the execution of instructions which proceeds along at least two different paths merges with execution continuing along a single path.

Figure 2:
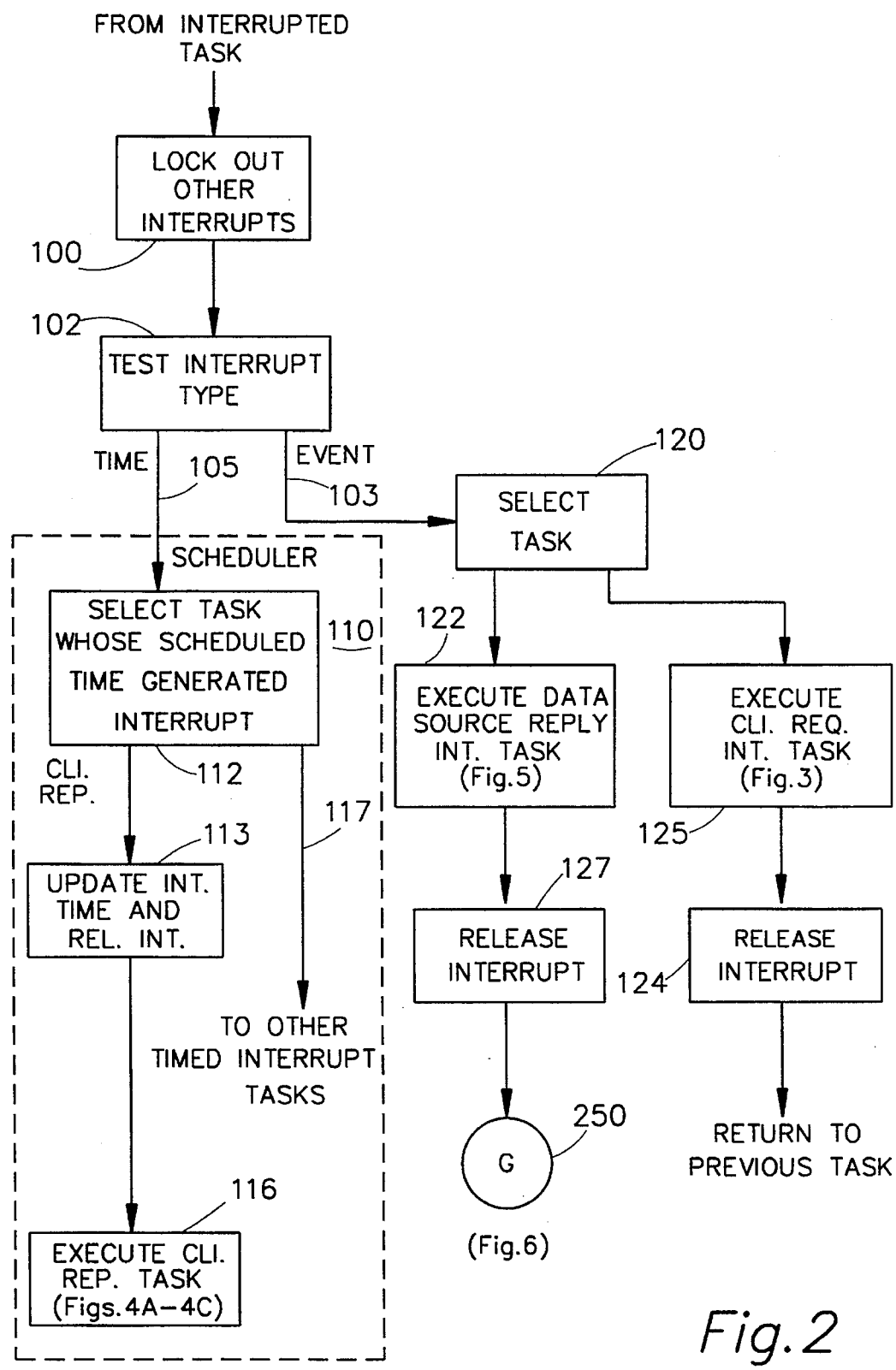
FIG. 2 is a flowchart of object code for loading in such a computer to cause it to comprise a part of an interrupt processing element.
Figure 3:
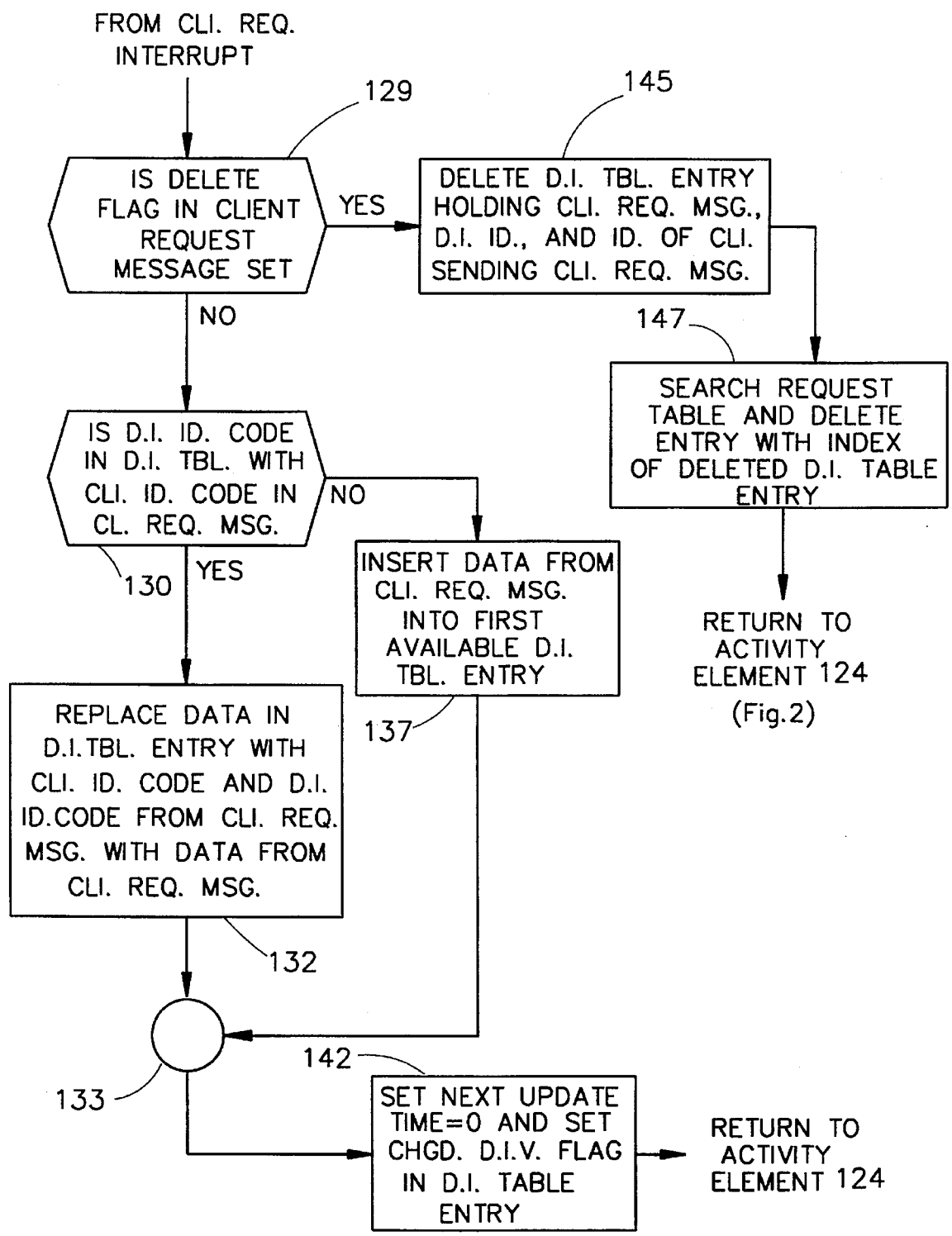
FIG. 3 is a flowchart of object code for loading in such a computer to cause it to comprise a means for entering into the data item table, a data item request supplied by a client.
Figure 4A:
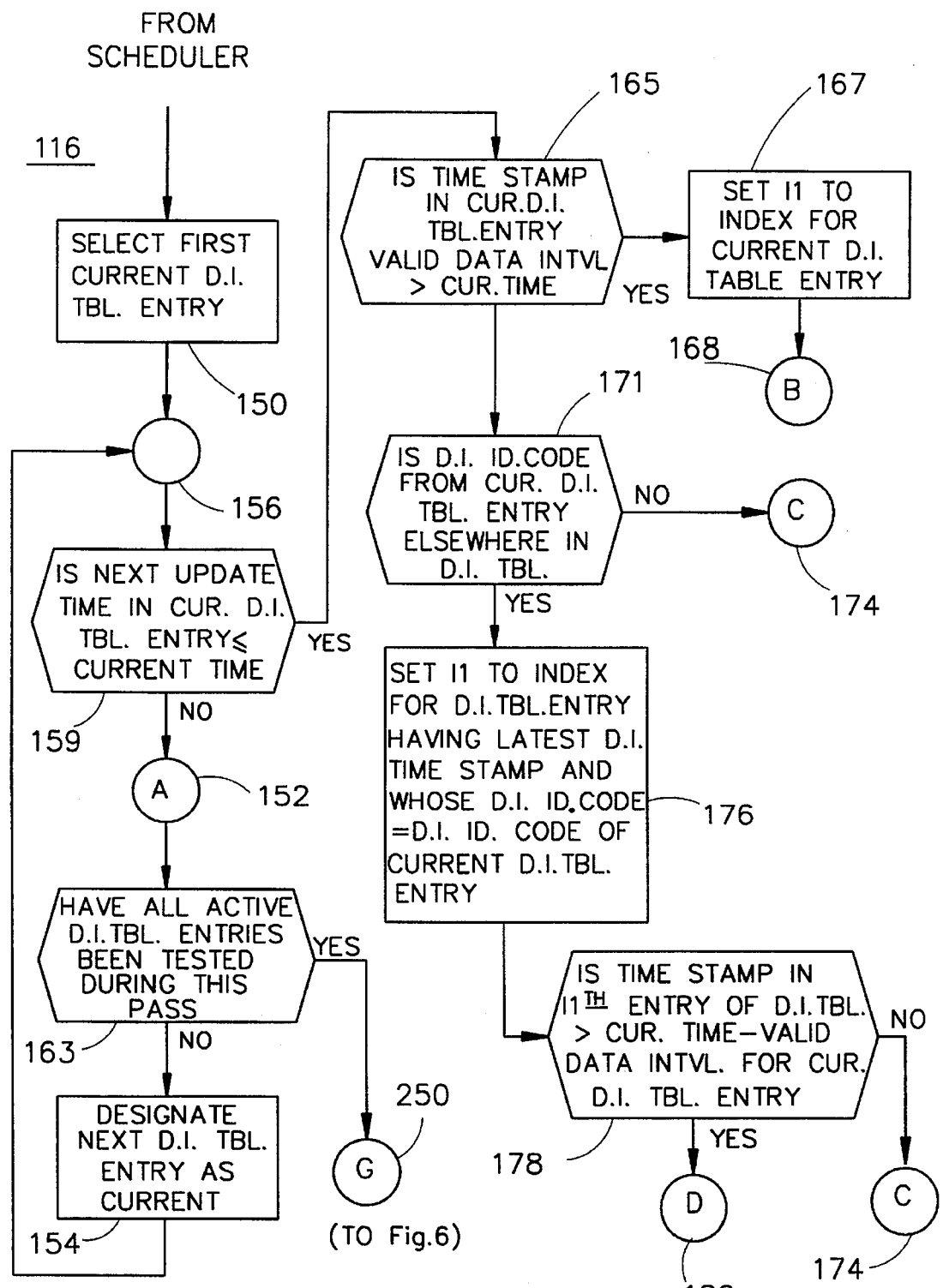
FIGS. 4A–4C in combination form a flowchart of object code for loading in such a computer to cause it to comprise a means for supplying the value of a requested data item to the requesting client.
Figure 4B:
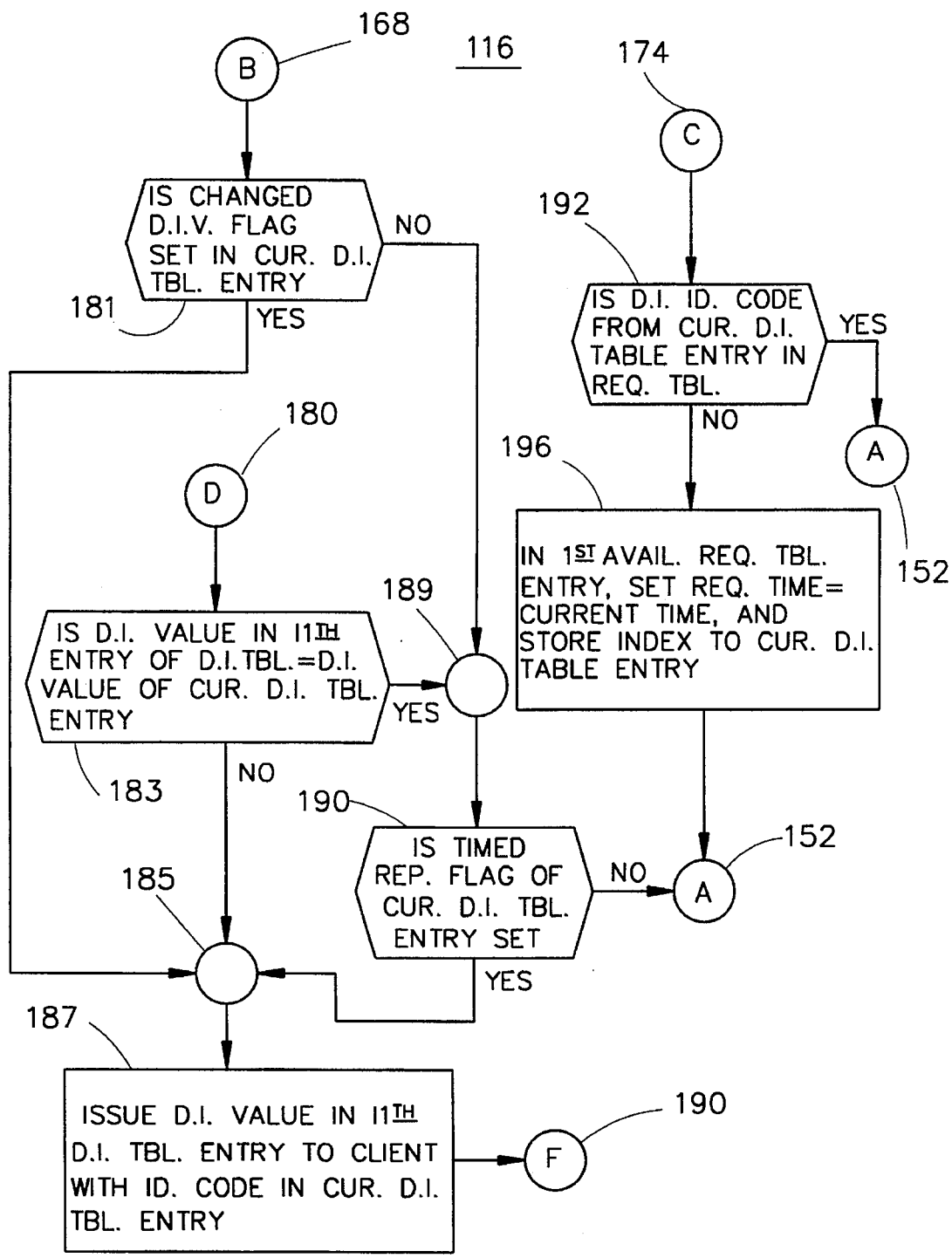
Figure 4C:
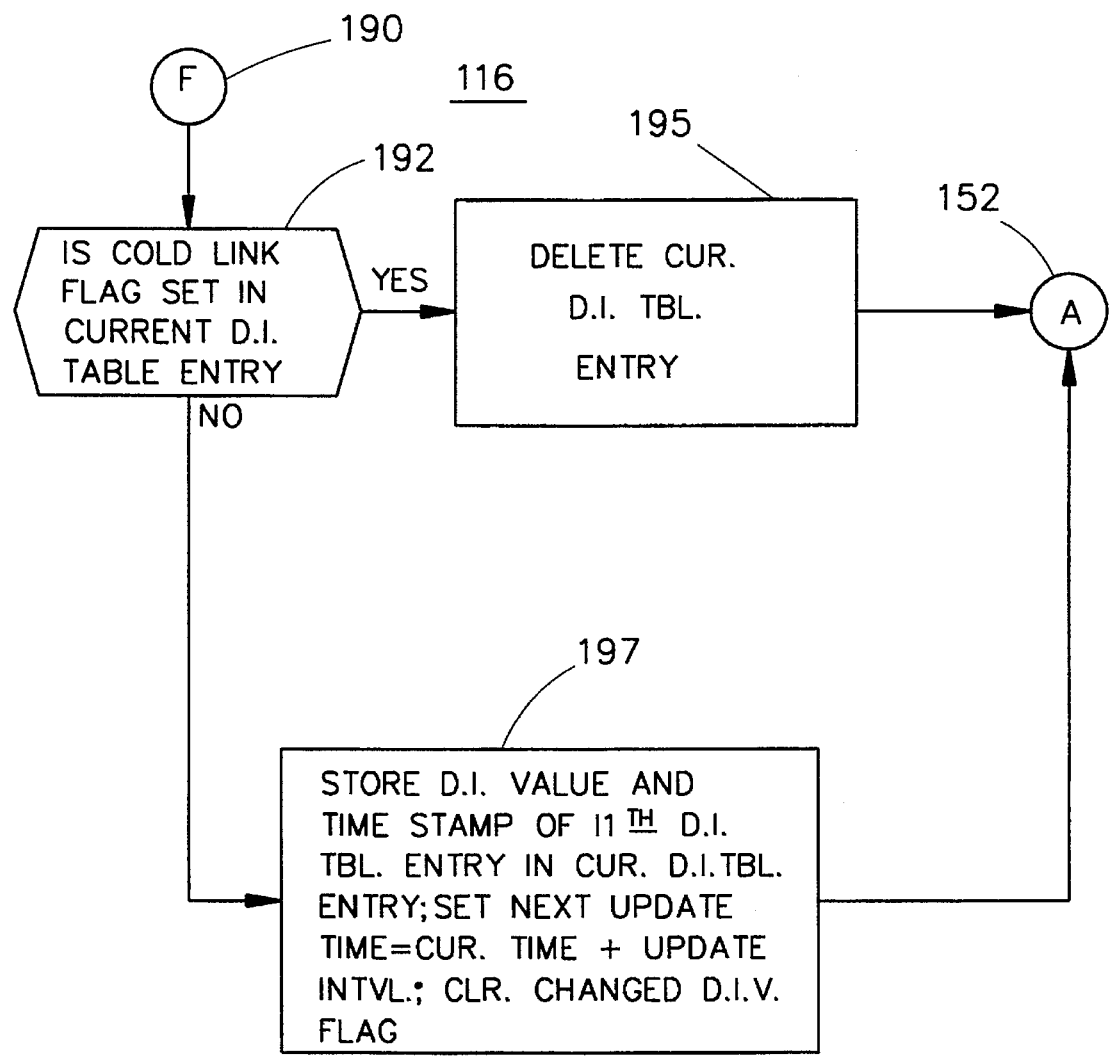
Figure 5:
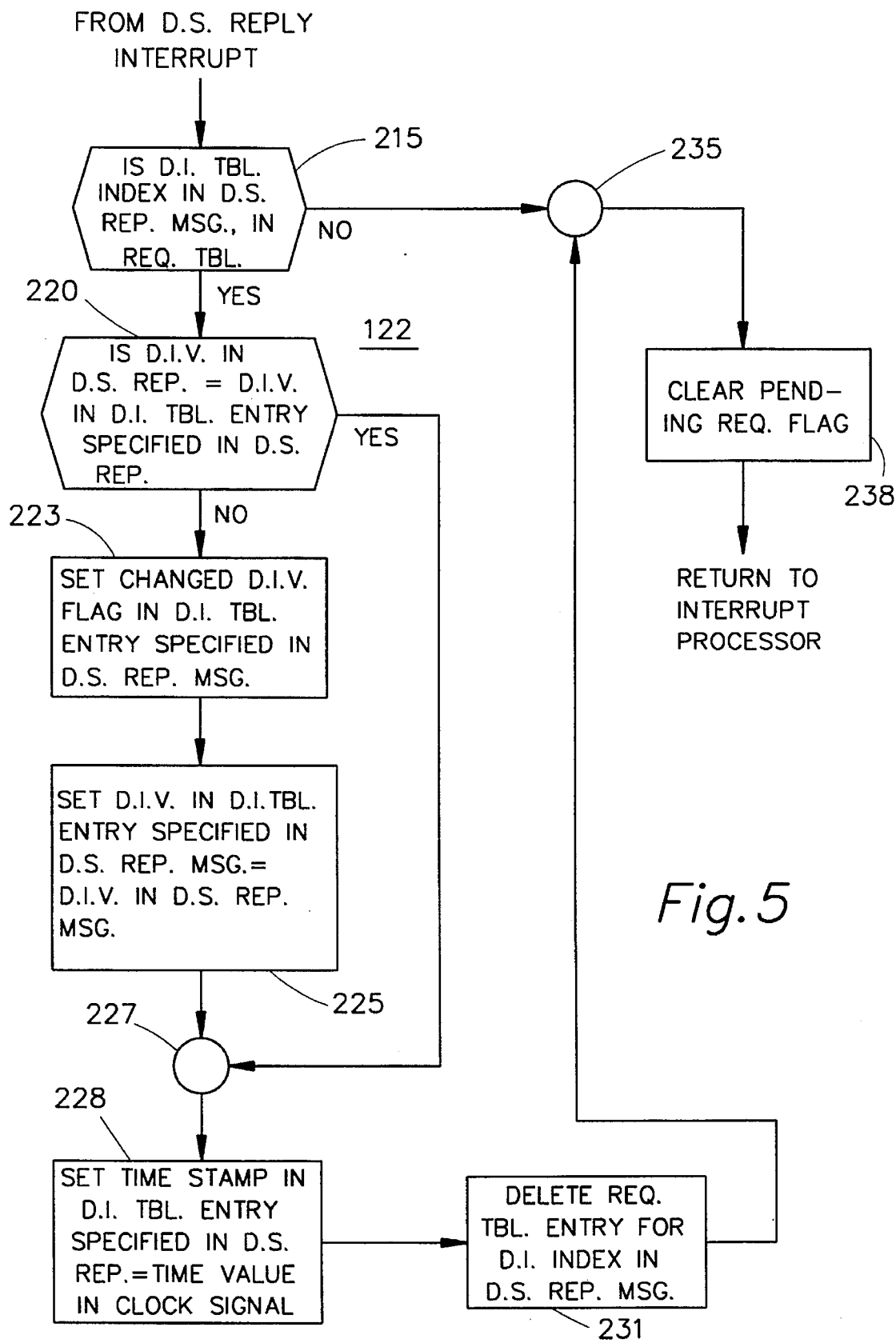
FIG. 5 is a flowchart of object code for loading in such a computer to cause it to comprise means for processing an interrupt announcing a data value-containing reply from a data source.

FIG. 2 represents the instruction executions which process the interrupts whose occurrences start execution of the instructions whereby computer 10 becomes the invention. The occurrence of a particular interrupt transfers instruction execution to the instruction in the address associated with that interrupt, thereby initiating the sequence of instruction execution by computer 10 which causes it to become one of the means-type elements of the invention shown in FIG. 1 for a period of time. The time interrupts cause the instructions which the flowcharts of FIGS. 4A–4C represent to be executed. The event-based interrupts cause the instructions which the flowcharts of either FIG. 3 or 5 represent to be executed. Typically, processing unit 12 has the capability to record the address of the instruction which normally was to have been executed at the time of the interrupt, and return execution to that address upon exiting from that task's instructions. It is conventional to store all of the processing unit 12 register contents at the time each interrupt occurs so as to be able to continue with instruction execution at a later time as though the interrupt had not occurred, by restoring these values and branching to the address recorded at the time of the interrupt. If a second interrupt occurs during the task which the first interrupt invoked, the processing unit 12 has the ability to stack and/or prioritize the interrupts, so that all tasks are performed and performed in the most appropriate order. These interrupt processing capabilities will be assumed hereafter.

When an interrupt is first detected, it is important that another interrupt not immediately cause a further alteration in the instruction execution sequence. Thus interrupt processing shown in FIG. 2 starts with an instruction represented by activity element 100 which locks out further interrupts at least of the type which has just occurred. In many types of processing units, this lockout function is automatically activated with the occurrence of an interrupt and a programmed interrupt lockout instruction is unneeded. After interrupt lockout, instructions of element 102 cause a test of the type of interrupt, time or event-based. In most types of computers, the type of interrupt is "tested" by virtue of the memory 14 address to which instruction execution is transferred. A time-based interrupt causes instruction execution to take path 105 and continue with the activities of a scheduler 110. Scheduler 110 contains activity elements representing instructions which perform the various activities necessary to cause each of the time interrupt tasks to be performed at the appropriate times. While only one of the tasks which implement this invention is time-based, there will typically be other tasks as well which are initiated by a time interrupt.

Within scheduler 110, a selector element 112 symbolizes the instructions whose execution cause processing unit 12 to further select the task for execution whose scheduled time caused the current interrupt. For purposes of this invention, there is only the single client reply task symbolized by activity elements 113 and 116, but there may be a number of other tasks as well which are performed in response to time interrupts. The task selection activity of element 112 can be done in a variety of ways, each of which are well known to skilled software designers. Depending on the outcome of this selection activity, instruction processing continues with either activity element 113 in initiating one of this invention's tasks, or another task symbolized by the flow line 117. The instructions represented by activity element 113 update the interrupt time for the next execution of the client reply task and then release the interrupt lockout. It is preferred to release this interrupt lockout before actually executing the selected task to allow any further interrupts to be sensed and appropriately handled.

The instructions which activity element 116 symbolizes are executed next, and cause the client request task of FIGS. 4A–4C to be performed. This task corresponds quite closely to the client reply means 52 of FIG. 1, although its functions are presented in much more detail in FIGS. 4A–4C. When the client reply task has been completed, instruction execution continues to connector element G 121 which symbolizes branching to the source request task of FIG. 6. The source request task is the software analog of source request task 39 in FIG. 1.

Event-based interrupts direct operation along path 103 which causes the task selector element 120 instructions to be executed. Again, the task selection function may be nothing more than branching to the address of the first instruction of the task to which the interrupt is directed. As mentioned above, it is customary that each event-based interrupt is accompanied by a message which specifies parameters to be used by the task which the interrupt invokes. Typically, there is a prearranged portion of memory 14 in which this interrupt message is available to the instructions of the task selected by the event interrupt action. Of course, there is also a prearranged format for each interrupt message which allows the task to process the message. In implementing the invention, the instructions which interpret the event interrupts select either a data source reply interrupt task 122 or a client request interrupt task 125. These two tasks cause the processing required by the related interrupt. Task 122 represents instructions causing processing unit 12 to handle the messages from data sources 56–58 containing the individual data item values and generally causes processing unit 12 to function as source reply means 33 of FIG. 1. Task 125 handles the messages from clients 21–23 requesting individual data item values and represents the activity of client request means 29 of FIG. 1. Task 122 represents the software elements shown in FIG. 5 and task 125 represents the software elements of FIG. 3. After the processing of either of tasks 122 or 125 has been finished, the interrupt lockout is released by executing the instructions of activity element 127, after which instruction execution proceeds to connector element G 250 of FIG. 6, which is the flowchart for the instructions implementing the source request means 39. Task 122 represents instructions which format processing unit 12 as source reply means 33 of FIG. 1, and task 125 represents instructions which format processing unit 12 as client request means 29. Since each of these tasks involve communication with an external device, it is important that the operation proceed without interruption. And since each of these tasks can be accomplished relatively quickly, it is also feasible to lock out other interrupts until the processing is complete for these tasks.

Turning to FIG. 3 first in further explaining the operation of this apparatus, the instructions which the elements therein represent receive and process the request messages supplied from the clients. The client request message from a client 21–23 which generates the interrupt to task 125 encodes the parameters which define the client reply messages, and as previously explained, is available to task 125 in some prearranged portion of memory 14. These parameters are stored in the data item table 65. It is convenient to tabulate them as they are referenced in the flowcharts in the following table, along with parameters recorded in the data item table 65 which are derived from other sources. Parameters with asterisks are derived from sources other than the client request messages.

| DATA ITEM TABLE DEFINITION | |
|---|---|
| Parameter | Description |
| D.I. ID. code | Data item identify code which identifies the data item and data source for the associated value |
| Client ID. code | Code which identifies the client which has requested the value of the entry's data item |
| Update interval | Nominal time between successive client replies for a particular data item code |
| Valid data interval | Maximum age of a data item value which can be sent in a client reply message; the update interval is used as the valid data interval in some embodiments |
| Timed rep. flag | Flag which when set specifies that a client reply is to be sent each time the update interval elapses, whether the data item value has changed or not |
| Changed D.I.V. flag | Flag set when a new data item value from a data source is different from the previous value |
| Delete flag | Flag which when set specifies that the data table entry for the data item and client involved is to be deleted |
| Cold link flag | Flag which when set specifies a cold link for the entry, i.e., that only one client reply message is requested |

DATA ITEM TABLE DEFINITION

| Parameter | Description |
| --- | --- |
| *Next update time | The time at which the activity for supplying a new data item value to the client which requested it should begin |
| *Data item value | The most recent value of the data item sent to the client which requested it |
| *Time stamp | The time in clock register 27 when the current data item was received from gateway 53 |

Task 125 includes a first decision element 129 which tests the delete flag forming a portion of the client request message, and if set, transfers execution to the activity element 145 instructions. These instructions search data item table 65 and deletes any entry in the data item table 65 which holds both the same data item identity code as the client request message does and the same client identity code as the client 21–23 which sent the client request message. The instructions of activity element 147 are then executed to delete any entry in the request table 68 which might have the data item table index of the just deleted data item table 65 entry. This is necessary because, first of all, a pending source request message generated in response to that data item table entry is no longer needed. And once an entry has been deleted from the data item table 65, the entry may subsequently be used by another client request message. A value provided by a data source 56–58 containing the data item table index for the deleted entry will thus usually be for the wrong data item and will corrupt the parameters in that data item table entry. Deleting the entry from the request table 68 will prevent the parameters from a source reply message for a deleted client request from being loaded into data item table 65.

If the delete flag in the client request message is not set, then the decision element 130 instructions are next executed, also causing a search of the data item table 65 for an entry having a data item identity code identical to that in the client request message, and the client identity code for the client 21–23 which generated the interrupt. If such an entry exists, this implies that the current client request message is intended to change the parameters for a pending client request message for that data item value and which is from the client which generated the present request. In such a case, instructions which activity element 132 represent, cause processing unit 12 to replace the parameters in the data item table 65 entry corresponding to the client providing the client request message and the data item identified in that client request message, with the parameters in that client request message. That is, the new client request message's parameters replace those in the active data item table entry for the same data item and client. Instruction execution then passes to activity element 142 through connector element 133.

In the more usual case where the data item identity code and client identity code combination present in the client request message are not already in an active data item table 65 entry, the instructions of activity element 137 are executed rather than those of activity element 132. These instructions provide for inserting the parameters of the client request message into the first available, i.e. inactive, entry of the data item table 65. Instruction execution then passes to the instructions of activity element 142. The joining of flow sequence lines at connector 133 from elements 137 and 132 symbolize the further instruction execution starting with the instructions of activity element 142. At this point the data item table 65 entry defined by the current client request message's data item and client holds values for the parameters listed in the Data Item Table Definitions table above which are supplied by the client request message.

Processing unit 12 next executes the instructions which activity element 142 represents, which sets to zero the next update time value held in the data item table 65 entry assigned to the present client request message. Setting the next update time value equal to zero will cause a client reply message for that data item table 65 entry to be sent as soon as possible. The instructions of activity element 142 also set a changed D.I.V. flag in the data item table 65 entry assigned to the present client request message. When set, this flag implies that the data item value for the data item identity code recorded in the related data item table 65 entry has changed. Instruction execution next passes back to the interrupt processor connector element 126.

Turning next to the flowchart of FIGS. 4A–4C (which should be considered together), these represent what is shown as client reply means 52 in FIG. 1 and task 116 in FIG. 2. Task 116 comprises the instructions which select the source for data item values and provide to the clients 21–23, the signals encoding client reply messages which contain these values. The general procedure which the instructions represented by FIGS. 4A–4C follow is to examine each of the active entries in data item table 65 to see if a reply to the client request message which generated that entry in the data item table 65 is currently due. If so, then the data item value either is selected from either this or another entry in the data item table 65 and sent in a client reply message to the client, or is requested from a data source 56–58. To accomplish this examination, the active entries in data item table 65 are sequentially designated as "current", starting with the first such entry. In point of fact, this designation as "current" typically means nothing more than that a data item table 65 index holds a numeric index value which designates the current entry in the data item table 65. The action of the instructions of activity element 150 designates the first active data item table 65 entry as current. After the initial current entry of the date item table 65 has been selected and that entry processed, the data item table index is advanced by the instructions of activity element 154 so as to sequentially designate each of the active entries in data item table 65 as current.

After the first current data item table 65 entry has been designated, the instructions of decision element 159 are executed to test the next update time value in the current data item table 65 entry. If this next update time value is less than the current time (provided by clock 27 and internally available to the software), this means that the next client reply message for that data item table 65 entry is now due to be sent, and execution continues with the instructions for decision element 165. If the next update time is greater than the current time, then the client reply message is not yet due for the current data item table entry, and execution continues with the instructions of decision element 163 which follow connector element A 152. Decision element 163 tests whether all of the active data item table 165 entries have been examined during this execution of task 116 and if not continues execution to activity element 154. Activity element 154 instructions designate the next active data item table 65 entry as current. Typically this simply means that the index by which each entry of data item table 65 is accessed is incremented to designate the next active entry. Then instruction execution branches to connector element 156 so that reexecution of the decision element 159 instructions causes the update time of the next, i.e. current, active data item table 65 entry to be examined. When all of the active data item table 65 entries have been examined, then instruction execution proceeds to the source request task of FIG. 6, as symbolized by the instruction sequence of connector element G 250.

Decision element 165 instructions test the time stamp for the data item value in the current data item table 65 entry to determine whether the age of that data item value is within the valid data interval for that data item table entry. As mentioned earlier, this valid data interval may be the update interval from the update interval table 70 for the current data item table entry, or may be derived from some other source. If the data item value in the current data item table 65 entry is valid (i.e. new enough), then instruction execution proceeds to activity element 167 which sets an I1 index to specify the current data item table 65 entry. Execution then proceeds to connector element B 168 in FIG. 4B and the instructions of decision element 181. If the instructions of decision element 165 determine that the data item value in the current data item table 65 entry is not valid, then the instructions which decision element 171 and activity element 176 represent are executed next. These instructions search the data item table 65 for every other entry having the data item identity code (but not the client 21–23 identity code) of the current entry. If found, the instructions of activity element 171 in this case set the index I1 to designate an entry for the data item identity code which has the latest (largest) time stamp value. The instructions of decision element 178 cause processing unit 12 to test whether the time stamp value in the I1th entry of the data item table 65 is within the valid data time interval. If this time stamp value is within the valid data time interval, then instruction execution proceeds to connector element D 180 and to decision element 183 on FIG. 4B. If the time stamp value of the I1th entry is prior to the valid data time interval, then it is necessary to procure the data item value with which to answer the client request message from which the current data item table 65 entry was formed, from the appropriate data source 56–58. This means that instruction execution must proceed to connector element 174.

Turning next to FIG. 4B, when the test performed by the instructions of decision element 165 cause the path of execution to continue through connector element B 168, then the instructions of decision element 181 are executed. These test whether the changed D.I.V. flag is set in the current entry of the data item table 65 entry. If it is set, then instruction execution continues with the instructions of activity element 187, as indicated by the execution path to the connector element at 185. (Recall that the changed D.I.V. flag is set when the data item value has changed since the last time a client reply message for that data item table 65 entry was sent to the specified client 21–23.) If the changed D.I.V. flag is not set, then the path of instruction execution passes through connector element 189 to the instructions of decision element 190. The tests of decision elements 181 and 190 are needed to handle the condition where there has been no change in the data item value since the last time the client reply message was sent for the current data item table entry and where the current data item table entry timed reply flag is not set. This set of conditions means that a client reply message is to be sent only if the data item value has changed during the time interval from the end of the previous update interval, to the end of the current update interval. If the timed reply flag of the current data item table 65 entry is not set, the instructions of decision element 190 cause the path of instruction execution to return to decision element 163 in FIG. 4A through connector element A 152.

If all of the conditions for providing an immediate client reply message have been met, then instruction execution reaches the point of connector element 185 and the instructions which activity element 187 represents are executed. These instructions generate the signal on path 37 of FIG. 1 encoding a client reply message to the client 21–23 whose identity code is in the current data item table 65 entry. The data item value in the client reply message is provided by the data item table 65 entry specified by the I1 index, and may be either the current data item table entry 65 or another data item table 65 entry having a suitably fresh value for that data item. The sequence of instructions then continues to connector element F 190 on FIG. 4C.

Connector element 190 symbolizes that the instructions of decision element 192 are next executed. These instructions test the cold link flag of the current data item table 65 entry. The cold link flag has the value specified by the client request message, and when set indicates that only a single client reply message is to be sent in response. If the cold link flag is set, the instructions of activity element 195, which delete the current entry from the data item table 65 are executed. The instructions which follow in the sequence of connector element A 152 in FIG. 4A are next executed. If the cold link flag for the current data item table entry is not set, then the instructions of activity element 197 are executed to update the parameters of the current data item table 65 entry to reflect the changes resulting from issuing the client reply message for the current data item table 65 entry. Executing these instructions stores in the current data item table entry, the data item value and time stamp from the I1th data item table 65 entry. Executing these instructions also sets the next update time value in the current data item table entry to the sum of the update interval in the current data item table 65 entry and the current time available on path 50 from clock 27. Executing the instructions of activity element 197 also sets the changed data item value flag of the current data item table entry to its cleared condition. Then execution of instructions passes to connector element A 152 in FIG. 4A.

The last of the functions performed by processing unit 12 in executing the instructions for task 116 involve the situation where a new data item value from the data source is required and there is no active entry presently in the request table 68 holding the index for the current data item table 65 entry. When this condition is detected by decision elements 165, 171, and 178, then instruction execution proceeds to the instructions starting with connector element C 174 in FIG. 4B. The first of these, the instructions of decision element 192, cause processing unit 12 to search the request table 68 for an entry containing the data item identity code in the current entry of the data item table 65. If this data item identity code is in request table 68, then this means that the previous processing of some entry in the data item table 65 assigned to this data item has caused the current data item table 65 entry's data item identity code to be placed in request table 68. It is therefore unnecessary to place a further entry for this data item in request table 68, since the source reply message for this data item will be supplied before the source reply message will be available for a request table 68 entry added at this time. This is one aspect of the invention which in some circumstances allows substantial reduction of traffic to and from gateway 53. One should note that it is entirely possible that the current data item table 65 entry may be the source of the entry in request table 68 which has the current data item table entry's data item identity code. This situation arises where the entry has been placed in the request table 68 during an earlier scan of the data item table 65 by the instructions of task 116, but gateway 53 has not yet responded with the answering source reply message.

If the instruction executions of decision element 192 do not find the data item identity code from the current data item table 65 entry in a request table 68 entry, then the instructions which activity element 196 represent are executed. These instructions store the current time value encoded in the signal on path 50 in an available request table 68 entry as the request time. The index for the current data item table 65 entry is stored in this request table 68 entry, and the request flag in this request table entry is set. Instruction execution then continues with the instructions of decision element 163 in FIG. 4A, which follow connector element A 152. Eventually all of the active data item table 65 entries will be examined, and instruction execution proceeds to connector element G 250 on FIG. 6, which is the flowchart for the task whose actions cause processing unit 12 to issue a new source request signal.

The software structure for source reply task 122 is shown in FIG. 5. The instructions which are symbolized in FIG. 5 are executed as a result of the interrupt which accompanies a source reply message. It should be recalled that the source reply message forming a part of source reply signal carried on path 42 in FIG. 1 is recorded in a standard location or format in a memory element of source reply means 33, so as to be available as needed. The first of these instructions are represented by decision element 215, and cause a search of the request table 68 entries for the data item table 65 index returned by gateway 53 in the data source message. If this data item table 65 index cannot be found in an entry of request table 68, this means that the data item table entry specified by the index has been deleted since the source request message to which the current data source reply message is a response, was issued to gateway 53. Instruction execution then proceeds to the instructions of activity element 238 whose start is indicated by connector element 235. The instructions of element 238 clear the pending request flag. The pending request flag is set by the instructions of activity element 270 in FIG. 6 in conjunction with issuing a source request signal on path 43. The pending request flag remains set whenever a source request signal has been issued but not yet answered by the related data source reply signal. When the pending request flag is set, a source request signal will not be issued.

If the data item table index in the data source reply message is found in an entry of request table 68, then the instructions of decision element 220 are executed next. These instructions cause processing unit 12 to test the data item value in the data source message against the data item value recorded in the data item table 65 entry specified by the data item table index in the data source message. If these two data item values are equal, instruction execution continues with the instructions starting at connector element 227, i.e., the instruction of activity element 228. If the two data item values are unequal, execution continues with the instructions of activity elements 223 and 225. Executing the instructions of activity element 223 sets the changed data item value flag in the data item table entry specified by the data item table index in the data source message. Setting this flag indicates that the data item value in this data item table 65 entry is different from the previous value. This flag is used to limit the issuance of client reply messages to occur only when the data item value changes, and this option is selected by the client request message.

Executing the instructions of activity element 225 sets the data item value in the entry specified by the data item table index in the data source message, to the data item value in the data source reply message. The instructions of activity element 228 are next in line to be executed.

The instructions of activity element 228 update the time stamp value in the data item table 65 entry specified by the data item table index in the data source message, to the current time encoded in the signal on path 50. The instructions of activity element 231 are executed in order to delete the entry in request table 68 which holds the data item table index in the data source reply message. Then the instructions of activity element 238 are executed, as shown by the flow line to connector element 235. After these instructions have been executed, then processing continues with the instructions of activity element 127 in FIG. 2, which release the interrupt lockout set earlier by the instructions of activity element 100. After the instructions of activity element 127 have been executed, execution continues to FIG. 6 and the instructions following connector element G 250.

Figure 6:
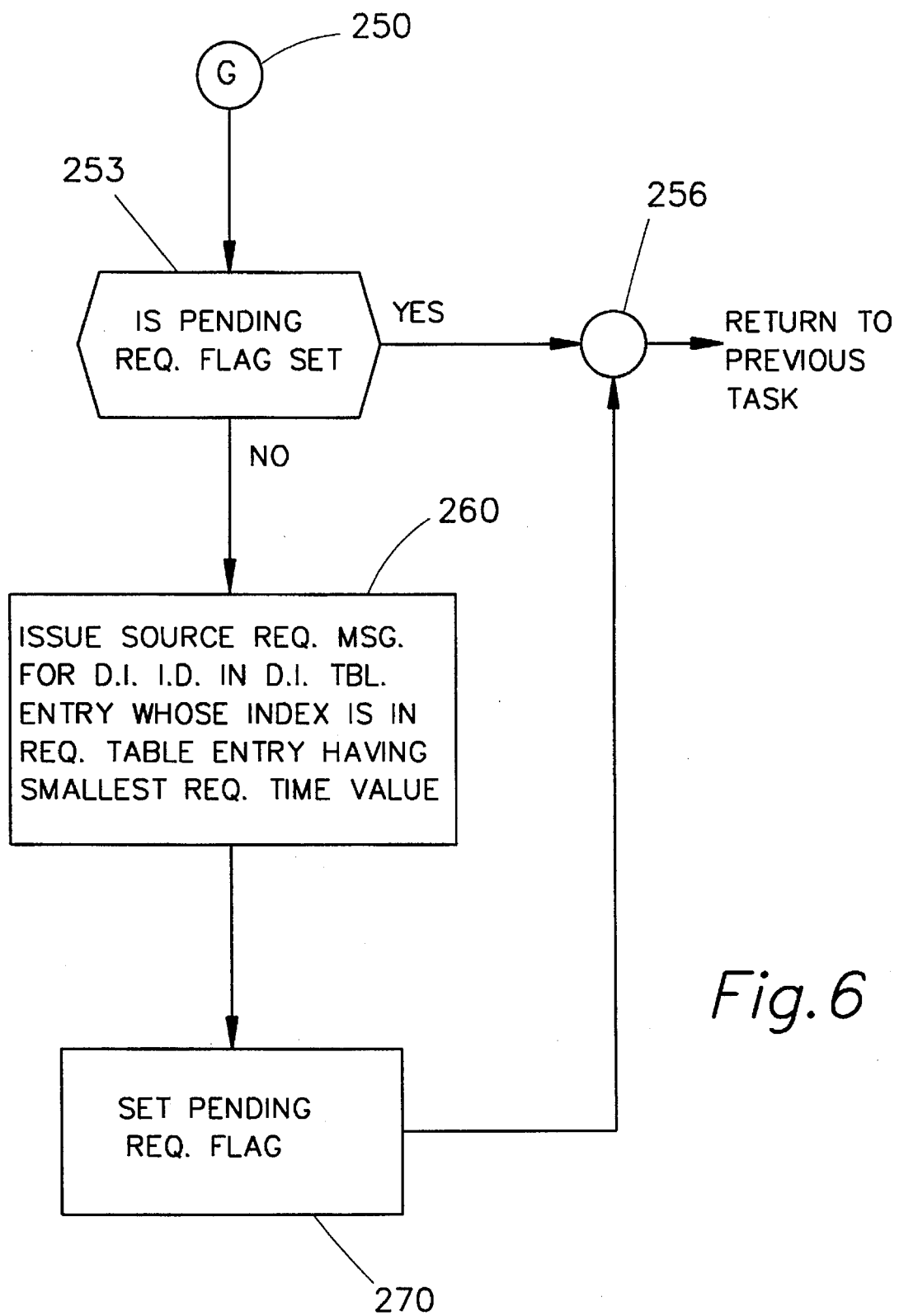
FIG. 6 is a flowchart of object code for loading in such a computer to cause it to comprise means for requesting the value of a data item from a data source.

The instructions symbolized by the elements of FIG. 6 cause any source request message required by the presence of one or more active entries in request table 68 to be issued. First of all, the instructions of decision element 253 test the value of the pending request flag, and if set causes an exit from this function to the previous task, as symbolized by the flow line to connector element 275. Recall that the protocol adopted here is that each source request message must be answered with a source reply message before another source request message is issued. The pending request flag is set whenever a source request message has been issued, but not answered.

If the pending request flag is not set, then the instructions symbolized by activity element 260 are executed. These instructions search the request table for the entry having the smallest (i.e., oldest) request time value. The data item table index in this request table entry is used to designate a data item table 65 entry, and the data item identity code in that entry is used to identify the data source and data item in a source request message which is sent to gateway 53 on path 43. Issuing a new source request message makes it necessary to again set the pending request flag, and executing the instructions of activity element 270 causes this action. No more source request messages will be sent until the present one is answered because of the presence of the instructions of decision element 253. In a commercial embodiment, there will likely need to be some time out interval specified after which it will be assumed that gateway 53 has failed to properly respond to a source request message, but this feature is conventional and also beyond the scope of this invention.

The embodiments of an invention in which an exclusive property or right is claimed are defined as follows:

1. An improvement in a communication system for supplying values provided by at least one data source for a plurality of data items each having assigned to it, its own data item identity code and each data item having its value available from a single data source, to each of a plurality of clients each having its own client identity code, each client supplying on a client data link, client request signals encoding a data item identity code and the client identity code and receiving on the client data link, client reply signals encoding values of data items in association with the respective data item identity codes thereof, said communication system including a server comprising i) a processing unit connected to at least one client data link and at least one source data link, and ii) a data memory in which data may be recorded and retrieved by the processing unit and in which may be recorded by the processing unit a data item table comprising a plurality of entries where in each entry may be recorded a client identity code, a data item identity code, and a data item value and wherein each data item table entry is designated by an identifier, and wherein each said data source is connected to a source data link allowing two way communication between the data source and the processing unit, each said data source providing a source reply signal to the server on the source data link to which it is connected responsive to a source request signal provided on the source data link by the processing unit, each said source request signal encoding a data item identity code, and said source reply signal encoding a value for the data item whose identity code was encoded in the source request signal for which the source reply signal is the response, wherein the processing unit includes the improved apparatus comprising:

a) client request means connected to a client data link and receiving client request signals thereon, for recording in a data item table entry for a client request signal, the identity code for the client supplying that client request signal and the identity code of the data item in that client request signal;

b) source request means connected to a preselected source data link and receiving from the data memory, the data recorded in selected entries in the data item table, for issuing source request signals to a data source on the preselected source data link, said source request signals encoding the data item identity codes recorded in the selected data item table entries;

c) a clock providing a clock signal encoding a time value comprising the current time of day wherein the source reply means further comprises means receiving the clock signal;

d) source reply means connected to each source data link and receiving the source reply signals therefrom, and connected to the clock and receiving the clock signal therefrom, i) for recording in an entry in the data item table in which is recorded the data item identity code encoded in the source request signal for which each source reply signal is a response, the data item value encoded in that source reply signal, and ii) for recording in the data item table in the entry whose data item value is provided by a source reply signal, a time stamp value equal to the time value encoded in the clock signal at the time that source reply signal was received;

e) client reply means connected to each client data link, for scanning the data item table, and for issuing a client reply signal on a client data link to at least two of the plurality of clients, each client reply signal encoding data item value and the data item identity code recorded in an entry of the data item table and wherein each client reply signal is provided to a client whose identity code is recorded in a data item table entry in which the data item identity code encoded in the client reply signal is also recorded;

f) data item selection means for selecting a data item table entry in which is recorded a time stamp value; and g) valid time means receiving the valid interval signal and the clock signal for calculating a valid data time value as a function of i) the time stamp value recorded in the selected data item table entry and ii) the valid data time interval encoded in the valid interval signal, and for issuing a client reply signal encoding the data item value recorded in the selected data item table entry responsive to the valid data time value exceeding the time value in the clock signal.

2. The communication system of claim 1, wherein the data item selection means comprises means for issuing a selection signal encoding the identifier designating the selected data item table entry; wherein the valid time means includes means for issuing an invalid data signal having a preselected value responsive to the time value in the clock signal exceeding the valid data time value; and wherein the source request means includes means receiving the selection signal and the invalid data signal, for issuing a source request signal encoding the data item identity code in the data item table entry designated by the identifier encoded in the selection signal responsive to the preselected value of the invalid data signal.

3. The communication system of claim 1, wherein the data item selection means includes means for selecting at least two data item table entries having recorded therein equal data item identity codes; and wherein the valid time means includes means for calculating for each of the selected data item table entries a valid data time value equal to the sum of i) the time stamp value recorded in the data item table entry and ii) the valid data time interval encoded in the valid interval signal, and for including in the client reply signal the data item value from the selected entry whose valid data time value is larger than that of any other selected entry and larger than the time value in the clock signal.

4. The communication system of claim 3, wherein the data item selection means comprises means for issuing a selection signal encoding an identifier designating the selected data item table entry; wherein the valid time means includes means for issuing an invalid data signal having a preselected value responsive to the time value in the clock signal exceeding each of the valid data time values; and wherein the source request means includes means receiving the selection signal and the invalid data signal, for issuing a source request signal encoding the data item identity code recorded in the data item table entry designated by the identifier encoded in the selection signal responsive to the preselected value of the invalid data signal.

5. The communication system of claim 4, wherein the source reply means comprises means for recording the data item value encoded in the source reply signal in the data item table entry designated by the identifier encoded in the selection signal which designated the data item table entry from which was retrieved the data item identity code in the source request signal to which the source reply signal is the response.

6. The communication system of claim 4, wherein the client request means further comprises means receiving a plurality of client request signals each encoding an update interval, for recording the update interval in the data item table entry for that update interval's client request signal; wherein the data item selection means includes means for selecting a data item table entry in which is recorded an update interval and in which is recorded an update time value smaller than the time value encoded in the clock signal, and means for thereafter setting the update time value equal to the time value encoded in the clock signal plus the update interval; wherein the valid interval means comprises means for encoding as the valid data time interval in the valid data time signal, the update interval in the selected data item table entry.

7. The communication system of claim 1, wherein the valid time means further comprises means responsive to the condition of the time value encoded in the clock signal exceeding the valid data time value, for scanning a plurality of the data item table entries, for comparing the time stamp values for each entry having a data item identity code equalling the data item identity code in the selected data item table entry, and for issuing a client reply signal encoding the data item value recorded in the entry having the largest time stamp value.

8. The communication system of claim 1, wherein the client reply means further comprises request table update means responsive to the time value in the clock signal exceeding the valid data time value, for recording in an entry of a request table held in a preselected portion of the data memory, the identifier of the selected data item table entry, and wherein the source request means comprises means for selecting a request table entry, and for issuing on the source data link to a data source a source request signal encoding a data item identity code recorded in the data item table entry designated by the data item table entry identifier recorded in the selected request table entry.

9. The communication system of claim 8, wherein the source reply means comprises means receiving the current source reply signal, and responsive thereto, for retrieving the request table entry in which is recorded the data item table identifier designating the data item identity code encoded in the source request signal to which the current source reply signal is the response, and for recording the data item value encoded in the source reply signal, in the data item table entry designated by the data item table entry identifier in the retrieved request table entry.

10. The communication system of claim 9, wherein the processing unit includes means for activating the source request means responsive to a source reply signal.

11. The communication system of claim 8, wherein the client reply means further comprises means for recording the time of day value encoded in the clock signal as a request time value in the request table entry in association with the data item table entry identifier, and wherein the source request means includes means for selecting the request table entry having the smallest request time value.

12. The communication system of claim 8, wherein the client reply means includes means for recording the identifier of the selected data item table entry in the request table responsive only to inequality between the identifier for the selected data item table entry and each of the data item table entry identifiers recorded in the request table entries.

13. The communication system of claim 8, wherein the valid time means further comprises means for selecting a plurality of data item table entries having equal data item identity codes, and for calculating a valid data time value for each of said selected entries, each said valid data time value for an entry equal to the time stamp value recorded in the entry plus the valid data time interval, and responsive to the largest valid data time value exceeding the time value in the clock signal, issuing a client reply signal encoding the data item value recorded in the data item table entry having the largest time stamp value, and wherein the request table update means further records in the request table, the identifier of a selected data item table entry responsive to the time value in the clock signal exceeding said largest valid data time value.

14. The communication system of claim 13, wherein the processing unit includes means for activating the source request means responsive to a source reply signal.

* * * * *